United States Patent
Eromaki

(10) Patent No.: US 9,602,726 B2
(45) Date of Patent: Mar. 21, 2017

(54) OPTICAL IMAGE STABILIZATION

(75) Inventor: Marko Eromaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/359,217

(22) PCT Filed: Nov. 23, 2011

(86) PCT No.: PCT/FI2011/051031
§ 371 (c)(1),
(2), (4) Date: May 19, 2014

(87) PCT Pub. No.: WO2013/076350
PCT Pub. Date: May 30, 2013

(65) Prior Publication Data
US 2014/0340537 A1    Nov. 20, 2014

(51) Int. Cl.
| | | |
|---|---|---|
| *H04N 5/232* | (2006.01) | |
| *G03B 5/06* | (2006.01) | |
| *G02B 27/64* | (2006.01) | |
| *H04N 5/225* | (2006.01) | |
| *G02B 5/06* | (2006.01) | |

(52) U.S. Cl.
CPC ........ *H04N 5/23283* (2013.01); *G02B 27/646* (2013.01); *G03B 5/06* (2013.01); *H04N 5/2254* (2013.01); *H04N 5/2257* (2013.01); *H04N 5/23212* (2013.01); *H04N 5/23287* (2013.01); *G02B 5/06* (2013.01); *G03B 2205/0023* (2013.01)

(58) Field of Classification Search
None
See application file for complete search history.

(56) References Cited

U.S. PATENT DOCUMENTS

| | | | |
|---|---|---|---|
| 4,840,473 A | | 6/1989 | Kushibiki et al. |
| 5,394,207 A | | 2/1995 | Fujisaki |
| 5,479,236 A | * | 12/1995 | Tanaka ............................ 396/55 |
| 5,689,369 A | * | 11/1997 | Noguchi ....................... 359/557 |
| 6,014,169 A | * | 1/2000 | Azusawa et al. .......... 348/208.8 |

(Continued)

FOREIGN PATENT DOCUMENTS

| | | |
|---|---|---|
| CN | 1582591 A | 2/2005 |
| CN | 101390009 A | 3/2009 |

(Continued)

OTHER PUBLICATIONS

Extended European Search Report for EP Application No. 11876215.2, Date of Completion of Search: Apr. 16, 2015, 6 pages.

(Continued)

*Primary Examiner* — Roberto Velez
*Assistant Examiner* — Yih-Sien Kao
(74) *Attorney, Agent, or Firm* — Locke Lord LLP

(57) ABSTRACT

In an apparatus, two or more actuators perform optical image stabilization by tilting a lens module of a camera unit when installed in the camera unit between the lens module and an image sensor. A variable prism is sandwiched between the lens module and the image sensor when the apparatus is installed in the camera unit for maintaining focal plane of the lens module on the image sensor independently of optical image stabilization operations caused by the tilting of the lens module.

19 Claims, 2 Drawing Sheets

(56) References Cited

U.S. PATENT DOCUMENTS

| | | | |
|---|---|---|---|
| 2005/0168584 A1* | 8/2005 | Uenaka | 348/208.99 |
| 2006/0033818 A1 | 2/2006 | Wada et al. | |
| 2007/0159599 A1* | 7/2007 | Yamada | 351/211 |
| 2007/0221821 A1 | 9/2007 | Feldman | |
| 2009/0109325 A1* | 4/2009 | Imai et al. | 348/373 |
| 2011/0122495 A1 | 5/2011 | Togashi | |
| 2011/0150441 A1 | 6/2011 | Ollila et al. | |
| 2011/0150442 A1* | 6/2011 | Ollila et al. | 396/55 |
| 2011/0187877 A1* | 8/2011 | Muukki | 348/208.4 |
| 2012/0212648 A1* | 8/2012 | Oka | G03B 17/14 |
| | | | 348/231.99 |

FOREIGN PATENT DOCUMENTS

| | | | |
|---|---|---|---|
| CN | 101688976 A | | 3/2010 |
| CN | 102209933 A | | 10/2011 |
| JP | 2005303148 A | * | 10/2005 |
| WO | WO2008/100153 | | 8/2008 |

OTHER PUBLICATIONS

International Search Report for International Application No. PCT/FI2011/051031—Date of Completion of Search: Nov. 28, 2012—6 pages.
PCT Written Opinion of the International Searching Authority for International Application No. PCT/FI2011/051031—Date of Completion of Opinion: Nov. 28, 2012—7 pages.
English Language Machine Translation of Chinese Patent Application Publication No. CN101390009A, 8 pages.
English Language Machine Translation of Chinese Patent Application Publication No. CN1582591A, 15 pages.
English Language Machine Translation of Chinese Patent Application Publication No. CN101688976A, 6 pages.
English Language Machine Translation of Chinese Patent Application Publication No. CN102209933A, 5 pages.
Chinese Search Report of Chinese Patent Application No. 2011800750110, Dated: Sep. 25, 2015, 2 pages.
EP Communication dated Mar. 1, 2016 for European Patent Application No. 118762152-1902, 5 pages.

* cited by examiner

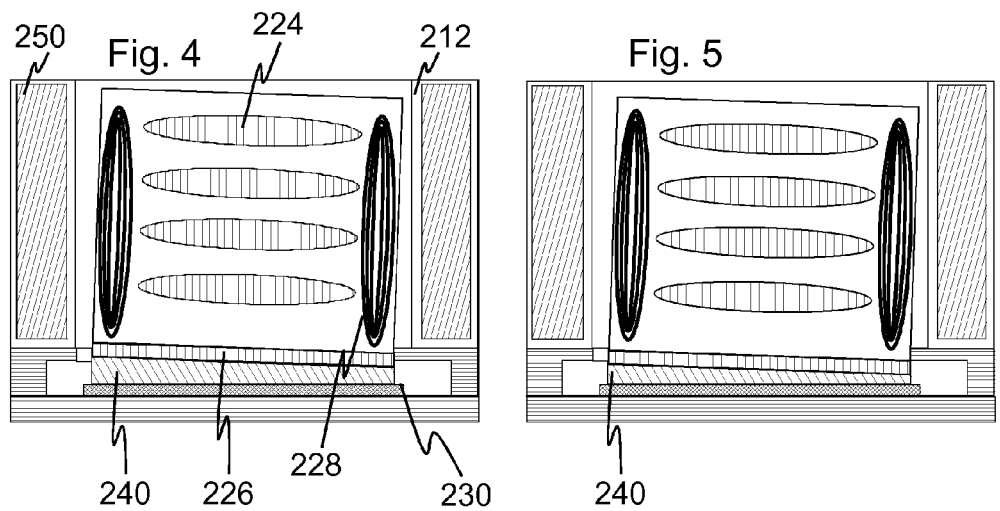
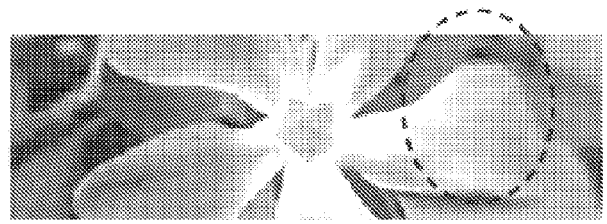
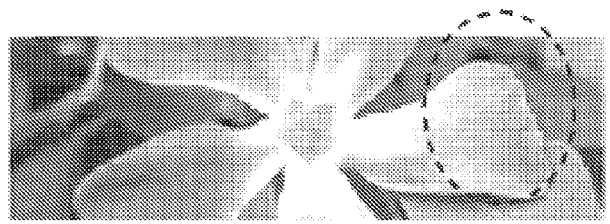
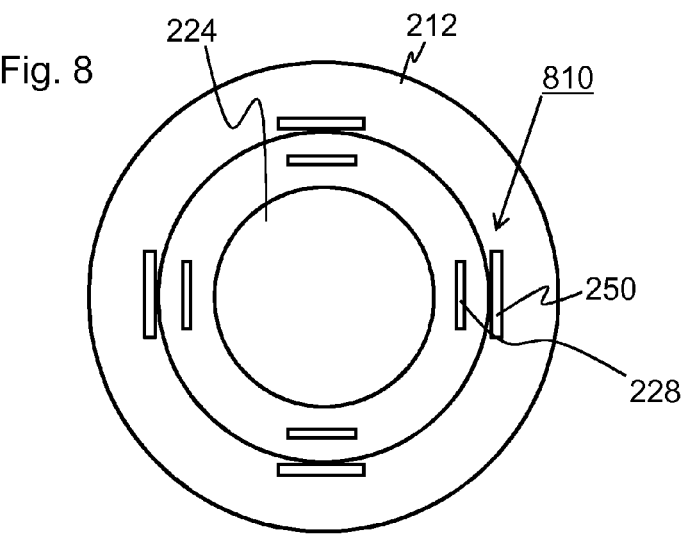

OPTICAL IMAGE STABILIZATION

TECHNICAL FIELD

The present application generally relates to optical image stabilization. In particular, though not exclusively, the present application relates to tilting optical image stabilization of camera phones and small digital cameras.

BACKGROUND

In digital cameras, blur caused by handshake is often reduced by employing image stabilization wherein it is attempted to form a digital image such that each pixel of an image corresponds to a given narrow beam ahead of the camera even if the camera were slightly shaken. In optical image stabilization, an image sensor is provided by a stabilized image by suitably moving either the image sensor or an optical unit of the camera. In electronic image stabilization, each pixel of an image is formed by dynamically varying the mapping of image sensor's pixels with the pixels of the image. The electronic image stabilization needs no moving parts or space for moving mechanisms and for moving the image sensor or the optical unit, but the image quality typically falls behind that produced by optical image stabilization.

Modern digital cameras often implement optical image stabilization by shifting a lens or image sensor shift in x-y-directions or parallel to the image sensor's plane. This solution is widely used in the camcorders and cameras. However, the shifting of a lens can easily distort the image especially at the edges and create perspective error. These problems practically restrict the extent of optical image stabilization to counter handshake by an equivalent of 3 to 4 exposure value steps.

SUMMARY

Various aspects of examples of the invention are set out in the claims.

According to a first example aspect of the present invention, there is provided an apparatus comprising:

two or more actuators configured to perform optical image stabilization by tilting a lens module of a camera unit when installed in the camera unit between the lens module and an image sensor; and a variable prism sandwiched between the lens module and the image sensor when the apparatus is installed in the camera unit.

The variable prism may be configured to maintain focal plane of the lens module on the image sensor independently of optical image stabilization operations caused by the tilting of the lens module.

The variable prism may be configured to perform the maintaining of the focal plane of the lens module on the image sensor by refracting light arriving to the variable prism towards the image sensor such that tilting of the focal plane of the lens module with relation to the image sensor is compensated by the variable prism.

The variable prism may be configured to maintain optical alignment or to reduce changes in the optical alignment between the image sensor and the lens module independently of the optical image stabilization operations.

The variable prism may be configured to mitigate user perceivable loss of focus in camera images produced while the lens module is tilted for optical image stabilization.

According to a second example aspect of the present invention, there is provided a method comprising:

performing optical image stabilization by tilting a lens module of a camera unit with relation to an image sensor; and refracting light passing through the lens module to the image sensor with a variable prism sandwiched between the lens module and the image sensor.

BRIEF DESCRIPTION OF THE DRAWINGS

For a more complete understanding of example embodiments of the present invention, reference is now made to the following descriptions taken in connection with the accompanying drawings in which:

FIG. 4 shows a cross-sectional view of the camera unit of FIG. 3 in a tilted orientation;

FIG. 5 shows a cross-sectional view of the camera unit of FIG. 3 in a tilted orientation and in an offset position for focus correction;

FIG. 6 shows an image taken by an image sensor when a lens module is tilted with relation to the image sensor with an air gap between the image sensor and a bottom element of lens module;

FIG. 7 shows an image taken by an image sensor when a lens module is tilted with relation to the image sensor with a variable prism between the image sensor and a bottom element of lens module; and FIG. 8 shows a top view of some details of the camera unit of FIG. 3 in the nominal orientation and position.

DETAILED DESCRIPTION OF THE DRAWINGS

Figure 1:
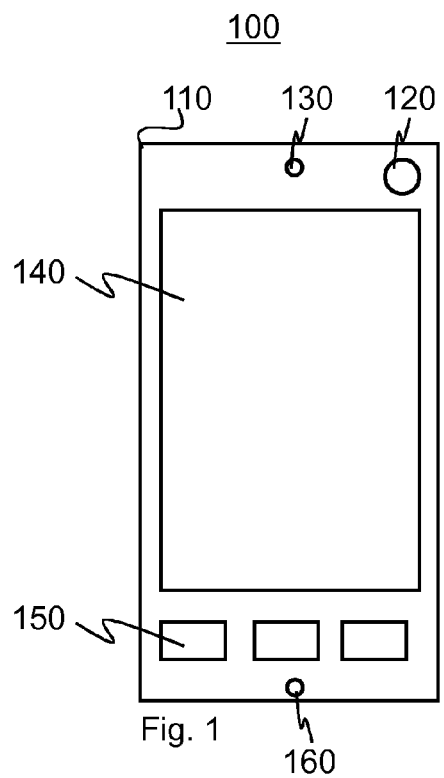
FIG. 1 shows a simplified front view of an apparatus of an example embodiment of the invention.

FIG. 1 shows a simplified front view of an apparatus 100 of an example embodiment of the invention. In this description, the apparatus generally refers to an entity of a multiplicity of different circuitries and parts such as a handheld device such as a mobile phone, personal digital assistant, game device, or navigator. However, it should be understood that in its barest form, the apparatus may comprise very few parts as is exemplified by the appended set of claims.

Figure 2:
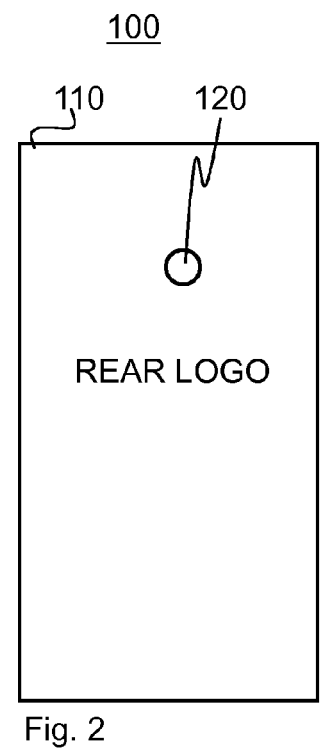
FIG. 2 shows a simplified rear view of an apparatus of an example embodiment of the invention.

The apparatus 100 comprises a body 110 comprising a front surface visible in FIG. 1 and a rear surface such as that visible in FIG. 2. The apparatus further comprises a camera unit 120, a speaker 130, a display 140, keys 150 and a microphone 160. Instead of or in addition to comprising a camera unit 120 on the front surface, the apparatus 100 comprises in an example embodiment the camera unit 120 on the rear surface. Some structures and functions of the camera unit are next described with further detail with reference to FIGS. 2 to 8.

Figure 3:
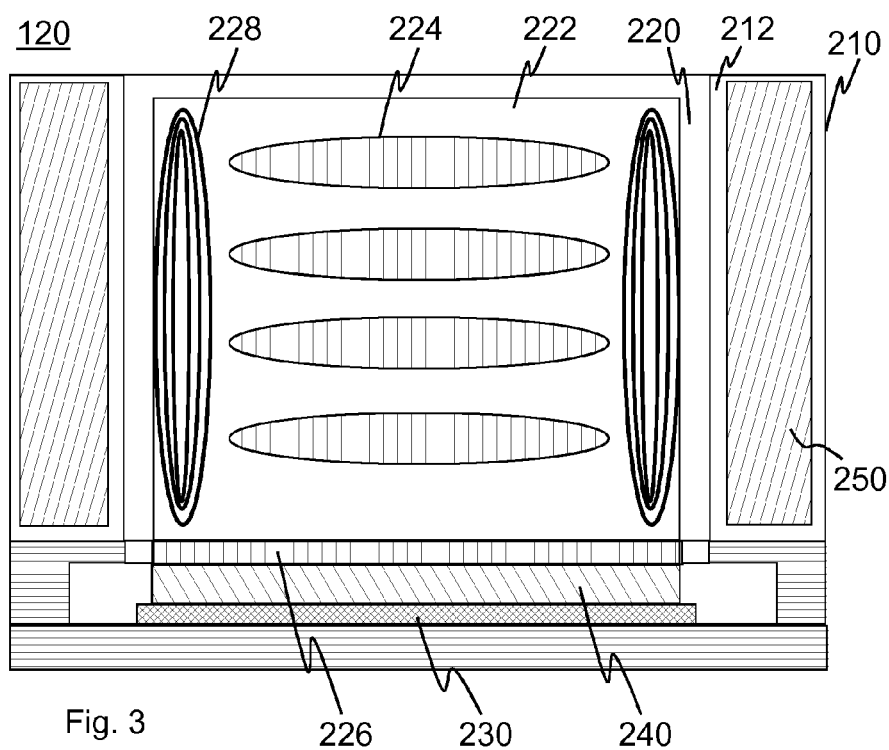
FIG. 3 shows a cross-sectional view of a camera unit of FIGS. 1 and/or 2 in a nominal orientation and position.

FIG. 3 shows a cross-sectional view of the camera unit 120 of FIGS. 1 and/or 2 in a nominal orientation and position. The camera unit 120 comprises a body 210 that has a cylindrical wall 212 that defines a cylindrical space 220 within which there is a lens barrel 222. The lens barrel 222 comprises and supports one or more lenses 224, an infrared light filter as a bottom element 226, and two or more coils 228 on different sides of the lens barrel 222 for automatic adjustment of the orientation and/or position of the lens barrel 222. The one or more lenses form a lens system.

Fixed to the body 210, there is also an image sensor 230 such that when focused, the lens system has a focal plane on or along the image sensor 230 so as to enable taking accurate digital images with the image sensor. Sandwiched between the image sensor 230 and the bottom element 226 of the lens system there is a variable prism 240. The variable prism 240 is formed, for instance, of optically clear or transparent gel such that the variable prism 240 encloses the space between image sensor 230 and the bottom element 226 from dust and maintains optical alignment between the image sensor and the bottom element 226 or maintains the focal plane of the lens system on the image sensor 230. In FIG. 3, the variable prism is sandwiched between the image sensor and the bottom element 226 i.e. the variable prism is and also remains during movements of the bottom element in contact with both the image sensor and the bottom element 226.

In operation, the variable prism 240 can be understood to reduce changes in the lens system's focal plane's alignment with relation to the image sensor 230 or to maintain the focal plane on the image sensor 230 by refracting light towards the image sensor 230.

Instead of gel, the variable prism is formed in an example embodiment of transparent liquid and side walls (not shown in FIG. 3). Inside the cylindrical walls 212 there are magnets 250. The magnets 250 and the coils 228 together form actuators (810 in FIG. 8). When aligned e.g. at 90 degree angles, the actuators (810) can tilt the lens system with respect to the image sensor 230 as shown in FIG. 4 that shows a cross-sectional view of the camera unit 120 of FIG. 3 in a tilted orientation. In FIG. 4, the volume of the variable prism is drawn to be substantially unchanged in comparison to FIG. 3. In other words, one side of the bottom element 226 is farther and the opposite side of the bottom element 226 is closer to the image sensor 230.

In an example embodiment, the camera unit 120 is miniaturized for use in devices such as mobile phones, laptop computers, video telephones, personal digital assistants, and handheld game consoles. The diameter of the image sensor 230, for instance, can be in the range of 1 to 5 mm. It is realized that implementation of an optical image stabilization in miniaturized camera units faces very different challenges than in larger camera units. The small dimensions also accent any errors and thus necessitate particularly high accuracy in mechanics. Thus, the implementations known e.g. from single-lens reflex (SLR) cameras, for instance, may be unsuitable and/or result in expensive and/or complex structures.

FIG. 5 shows a cross-sectional view of the camera unit of FIG. 3 in a tilted orientation and in an offset position for focus correction. In comparison to FIGS. 3 and 4, the lens barrel 222 is brought down closer to the image sensor for focusing of an imaging object. The variable prism 240 has a varying volume between the bottom element 226 and the image sensor 230. This variability is implemented, for instance, by using compressible gel or by forming the variable prism 240 of non-compressible fluid with reserves outside the volume that is sandwiched between the bottom element 226 and the image sensor. For instance, the sides of the variable prism 240 may be formed of rubber or other flexible material that lets the variable prism laterally expand farther away from the space between the bottom element 226 and the image sensor when the variable prism is squeezed shallower and to let optical fluid to flow into that space when the variable prism should grow thicker. The lens module stands on top of a gel cushion, when optical gel is used to form the variable prism 240.

In typical camera modules, the space or back focal length between the image sensor 230 and the bottom element 226 is used for avoiding dust being captured on the image sensor 230. Miniaturized camera modules in particular may be sensitive to dust as the image sensor is relatively small (e.g. couple of millimeters in diameter). The smaller the parts, the more significant impact small dust particles may have. In the example embodiments illustrated by FIGS. 3 to 5, the dust gap between the bottom element 226 and 230 is sealed by the variable prism. At the same time, optical image stabilization can be implemented by tilting the lens barrel 222. Moreover, the optical fluid such as soft gel also provides lateral support for the bottom element 226 such that the lens module can be simply directed as desired by inducing forces in central or opposite part of the lens module. For maintaining the lateral support, the optical fluid such as gel in one example embodiment substantially non-flowable, optically transparent fluid. The gel can be configured to maintain such mechanical properties over a temperature range required for normal use of the apparatus 100, such as −30° C. to +100° C. or +5° C. to +30° C., for example.

Further still, when the lens barrel 222 has a small diameter such as 1 mm to 5 mm, a tilt of e.g. 1 or 2 degrees requires very little depth to implement. Thus, the optical image stabilization may be built without adding millimeters to the thickness of the camera module. Yet further, the lens barrel 222 can be moved towards and apart of the image sensor so as to change focusing of the lens module. Both optical image stabilization and autofocus are implemented using common actuators as, for instance, laid out in FIG. 8. With three, four or more actuators 810, it is possible to create different forces affecting on the lens module towards or apart of the image sensor 230 such that the lens module is simultaneously tilted to desired direction and offset by desired extent with respect to the image sensor 230. Yet, only one set of magnets 250 is needed which results in savings of cost, weight and complexity.

When the actuators 810 are formed with inductive couplings e.g. using coils and permanent magnets, the range of each inductive coupling can be determined by e.g. through measurement of reactance of a coil in question. Using relationship between reactance or inductance and the range of an inductive coupling for two or more of the coils, the position and/or orientation of the lens barrel 222 can be determined. In another example embodiment, the determination of the position and/or orientation of the lens barrel makes additionally or alternatively use of dedicated position or orientation sensors such as Hall effect sensors. The number of the dedicated position or orientation sensors can be 2, 3, 4 or more, for instance.

FIG. 6 shows an image taken by an image sensor 230 when a lens module is tilted with relation to the image sensor 230 with an air gap between the image sensor 230 and a bottom element of lens module 226. Tilting of the lens system with respect to the image sensor 230 correspondingly tilts the focal plane of the lens system with respect to the image sensor 230. Hence, where the focal plane falls outside the image sensor's 230 imaging plane, the image becomes blurred. In FIG. 6, the image is taken such that one side of the bottom element remains in place and the right-hand side is brought closer to the image sensor 230 by tilting the lens barrel to the right. In result, the right hand side part of the image is blurred.

FIG. 7 shows an image taken by an image sensor 230 when a lens module is tilted with relation to the image sensor 230 with a variable prism 240 between the image sensor 230 and a bottom element of lens module. Unlike FIG. 6, the image remains focused when the variable prism 240 is formed using optical fluid the refractive index of which is greater than 1. In one example embodiment, the refractive index of the optical fluid is closer to that of the bottom element 226 than that of air.

The images produced by the image sensor 230 are presented in one example embodiment on the display 140 which thus operates as a viewfinder for the user.

FIG. 8 shows a top view of some details of the camera unit of FIG. 3 in the nominal orientation and position. FIG. 8 has been discussed in connection with the other Figures.

Without in any way limiting the scope, interpretation, or application of the claims appearing below, a technical effect of one or more of the example embodiments disclosed herein is that a camera unit can be equipped with optical image stabilization making use of the normal air gap between the image sensor and the lens module's bottom element. Another technical effect of one or more of the example embodiments disclosed herein is a variable prism both corrects the focal plane of the lens module to cast its image on the image sensor and blocks entry of dust on the opposing surfaces of the image sensor and the bottom element. Thus, dust problems in images can be mitigated. Another technical effect of one or more of the example embodiments disclosed herein is that the optical image stabilization is performed by moving a relatively small mass of the lens module and the power consumption is correspondingly low and/or the optical image stabilization can be rapid. Another technical effect of one or more of the example embodiments disclosed herein is that the optical image stabilization and autofocus can be performed using a common actuator system so that operating power, complexity and the number of potentially failing components can be reduced. Another technical effect of one or more of the example embodiments disclosed herein is that electromagnet actuators can be used for the optical image stabilization with resulting fast response, linear characteristics and generally reliable operation. Another technical effect of one or more of the example embodiments disclosed herein is that user-perceivable focus problems may be avoided in images produced by the image sensor while tilting the lens system with relation to the image sensor.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The invention claimed is:

1. An apparatus, comprising:
 an image sensor;
 a lens barrel comprising and supporting one or more lenses and a bottom element;
 two or more actuators configured to perform optical image stabilization by tilting the lens barrel with relation to the image sensor; and
 a variable prism sandwiched between and in contact with both the bottom element and the image sensor wherein the variable prism is further configured to maintain focal plane of the one or more lenses on the image sensor independently of optical image stabilization operations caused by the tilting of the lens barrel, the variable prism being configured to remain, during movements of the bottom element, in contact with both the image sensor and the bottom element.

2. The apparatus of claim 1, wherein the variable prism is further configured to refract light arriving to the variable prism towards the image sensor such that tilting of the focal plane of the lens barrel with relation to the image sensor is compensated by the variable prism.

3. The apparatus of claim 1, wherein the variable prism is configured to maintain optical alignment or to reduce changes in the optical alignment between the image sensor and the lens barrel independently of the optical image stabilization operations.

4. The apparatus of claim 1, wherein the variable prism comprises transparent gel sandwiched between the bottom element and the image sensor.

5. The apparatus of claim 1, wherein the variable prism is further configured to form a dust seal between the camera sensor and the bottom element.

6. The apparatus of claim 1, comprising four of the actuators.

7. The apparatus of claim 1, wherein the actuators comprise coils configured to produce respectively controllable inductive forces for tilting the lens barrel.

8. The apparatus of claim 1, further comprising a display configured to operate as a viewfinder showing image from the image sensor while the two or more actuators perform image stabilization operations.

9. The apparatus of claim 1, further comprising a memory configured to store images captured by the image sensor.

10. The apparatus of claim 4, wherein the actuators are further configured to be operable to perform autofocus movement of the lens barrel with relation to the image sensor, and the variable prism is configured to stretch and compress according to the autofocus movements of the lens barrel.

11. The apparatus of claim 4, wherein the actuators are further configured to be operable to perform autofocus movement of the lens barrel with relation to the image sensor, and the variable prism is configured to stretch and compress according to the autofocus movements of the lens barrel; and
 wherein the variable prism is further configured to form a dust seal between the camera sensor and the bottom element.

12. The apparatus of claim 6, wherein the actuators are further configured operable to perform autofocus movement of the lens barrel with relation to the image sensor and the variable prism is configured to stretch and compress according to the autofocus movements of the lens barrel.

13. The apparatus of claim 6, wherein the actuators are each configured to produce controllable forces in respective sides of the lens barrel so as to tilt the lens barrel by a desired angle and to a desired direction.

14. The apparatus of claim 7, further comprising an orientation determining circuitry configured to determine at least one of present tilting and auto focus state, based on prevailing inductances of the coils.

15. A method, comprising:
 supporting one or more lenses and a bottom element by a lens barrel;

supporting an image sensor at a given distance from the bottom element;
supporting a variable prism sandwiched between and in contact with both the bottom element and the image sensor;
performing optical image stabilization by tilting the lens barrel with relation to an image sensor;
refracting light passing through the lens barrel to the image sensor with the variable prism;
maintaining focal plane of the one or more lenses on the image sensor independently of optical image stabilization operations caused by the tilting of the lens barrel; and
maintaining the variable prism during movements of the bottom element in contact with both the image sensor and the bottom element.

16. The method of claim 15, further comprising maintaining by the variable prism focal plane of the lens barrel on the image sensor independently of optical image stabilization operations caused by the tilting of the lens barrel.

17. The method of claim 15, wherein the variable prism comprises transparent gel sandwiched between the lens barrel and the image sensor.

18. The method of claim 15, further comprising performing autofocus movements of the lens barrel with relation to the image sensor and stretching and compressing the variable prism according to the autofocus movements of the lens barrel.

19. The method of claim 15, further comprising showing image from the image sensor on a display while performing image stabilization operations.

* * * * *